Oct. 23, 1956   A. B. EREKSON ET AL   2,768,085
METHOD OF PACKAGING CHEESE
Filed Oct. 10, 1951   3 Sheets-Sheet 1
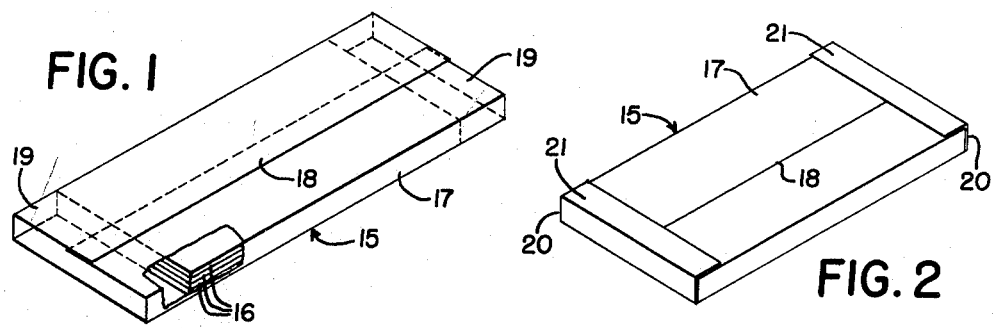
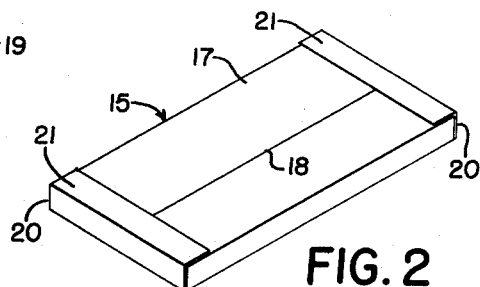
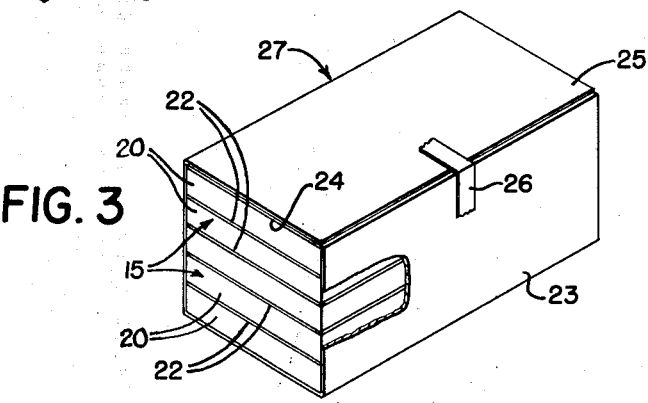
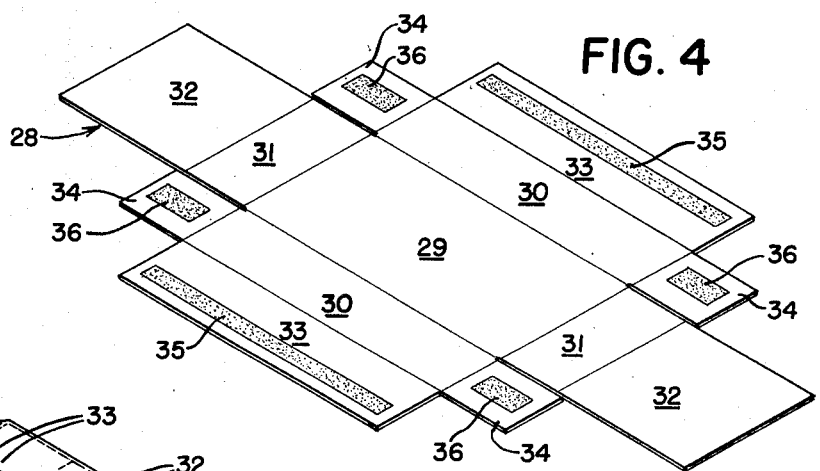
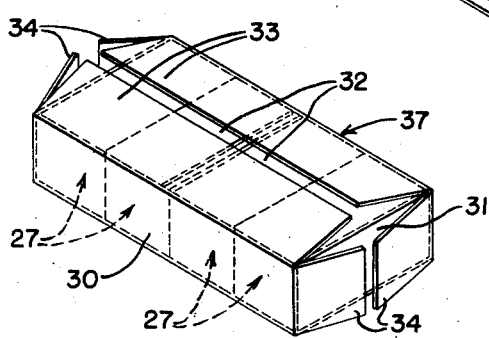
INVENTORS
ARTHUR B. EREKSON
JOHN R. PALMER
BY
F. J. Pisarra
ATTORNEY Oct. 23, 1956    A. B. EREKSON ET AL    2,768,085
METHOD OF PACKAGING CHEESE
Filed Oct. 10, 1951    3 Sheets-Sheet 2
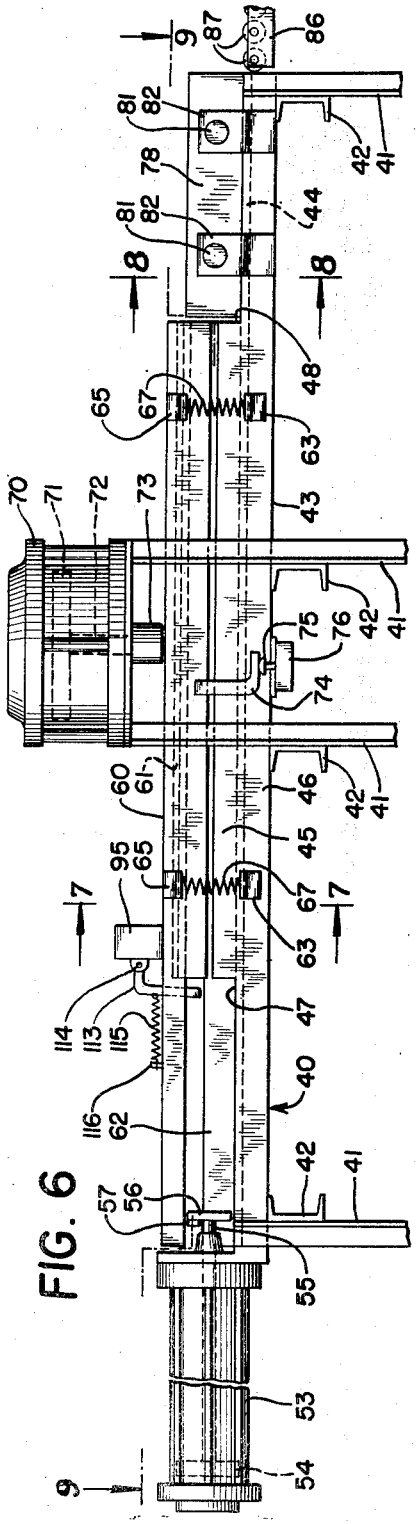
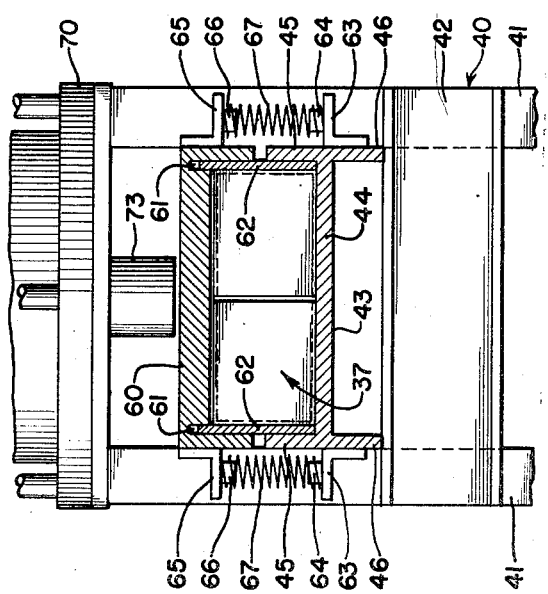
INVENTORS
ARTHUR B. EREKSON
JOHN R. PALMER
BY
*F. J. Pisarra*
ATTORNEY

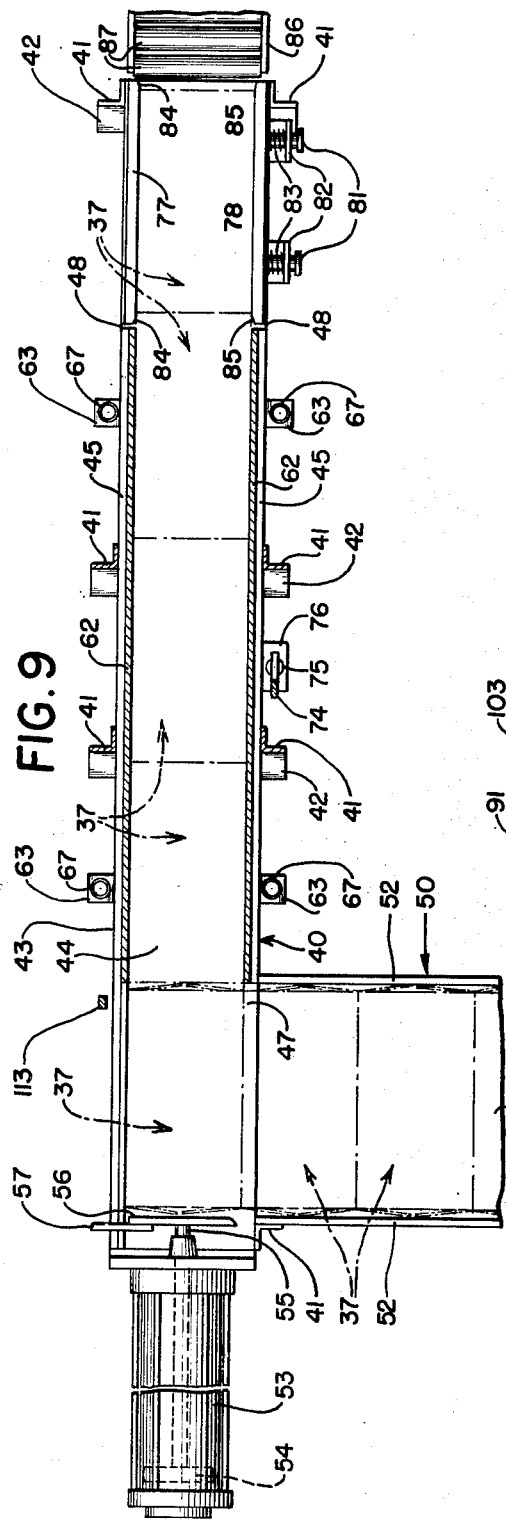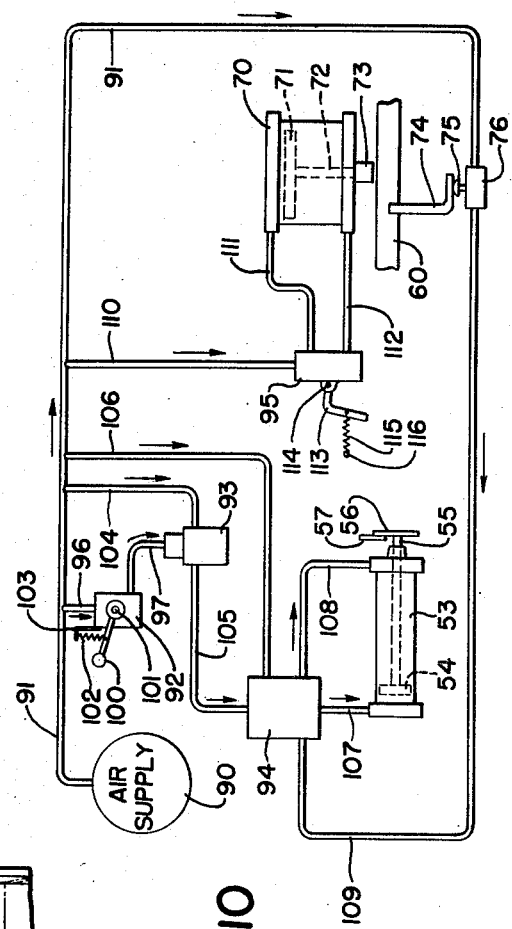

2,768,085
Patented Oct. 23, 1956

United States Patent Office

2,768,085
METHOD OF PACKAGING CHEESE

Arthur B. Erekson, Plymouth, and John R. Palmer, West De Pere, Wis., assignors to The Borden Company, New York, N. Y., a corporation of New Jersey Application October 10, 1951, Serial No. 250,646

10 Claims. (Cl. 99—178)

This invention relates generally to the art of packaging cheese, and, in a more specific aspect, to an improved method of packaging process cheese whereby the same may be maintained for prolonged periods of time under normal refrigeration conditions without spoilage due to mold growth.

Experience has demonstrated that conventionally packaged sliced process cheese has a shelf life which, for practical purposes, is too short. That is, such packages may not be maintained under normal refrigeration conditions in a retail outlet and then in the home for a long enough period of time before becoming spoiled due to mold growth. Tests have demonstrated that all cheese packages of this type become unsalable within a period of 18 days when stored at temperatures of from 40 to 50° F., and within 12 days when stored at a temperature of 60° F. As a practical matter, it is desirable that the cheese have a shelf life of at least 45 days when stored at temperatures between 40 to 50° F.

We have discovered that cheese that is packaged in accordance with our method may be stored at from 40 to 50° F. for at least 45 days without becoming spoiled, or otherwise objectionable, by virtue of mold growth. Our invention contemplates enclosing the cheese in a heat-sealable wrapper and expelling substantially all air entrapped within the wrapper prior to, or at the time of, completely sealing the same. Inasmuch as cheese mold cannot grow without oxygen, the elimination of air from within the wrapper of the cheese package prevents mold spores that may be present in the cheese from growing and spoilage of the packaged cheese is prevented. Neither the wrapper nor the cheese is treated with any mold growth inhibiting chemical. The wrapper may comprise any thin, flexible, heat-sealable material that is impervious to air and moisture. We find that wrappers made of certain thermoplastic films, such as cellophane, wax coated paper, or the like, are well suited for use in practicing this invention.

A primary object of the invention is to package cheese, such as sliced process cheese, in a manner that the same may be maintained for prolonged periods of time under normal refrigeration conditions without becoming spoiled.

Another object of the invention is to protect packaged cheese against contamination and to prevent or retard mold growth in such cheese without the aid of chemical mold inhibiters.

The invention has for another object the provision of an improved method for packaging sliced process cheese whereby such cheese may have a considerably longer practical shelf life than conventionally packaged sliced process cheese.

To the end that the foregoing objects may be readily attained, the method of practicing this invention may and preferably comprises first arranging a plurality of process cheese slices, that are at a temperature within a range of 30 to 65° F. and that are substantially equal in size, in aligned stacked relation. The stacked cheese is enclosed in a heat-sealable wrapper of the character indicated earlier herein with the extremities of the wrapper arranged in overlapping relation longitudinally along the top of the stack. These overlapping extremities are then heat-sealed. The end portions of the wrapper extend beyond corresponding ends of the stack and each such portion is folded so that a part thereof bears against and is unsealed with respect to another part at the corresponding end of the stack. This results in a wrapped cheese package that is incompletely sealed; that is, the wrapper is unsealed at its ends.

The packages are then packed in shipping cartons, in a manner to be described further along herein, and the cartons and contents are subjected to a sufficient pressure over a predetermined period of time to expel substantially all of the air entrapped within individual wrappers. We find that for best results this pressure should be within the range of 200 to 400 pounds per pound of cheese in each package. Also, the pressure should be applied to the cheese for a time interval within the range of 5 seconds to one minute. Heat is then applied to each carton in a manner that the aforementioned parts of the end portions of the wrapper are heated sufficiently to effect sealing of such parts to each other, thereby completing the sealing of the cheese packages.

The enumerated objects as well as other objects, together with the advantages of this invention, will be readily apparent to persons skilled in the art upon reference to the following detailed description taken in conjunction with the accompanying drawings.

In the drawings, wherein like reference numerals denote corresponding parts throughout the several views:

Figure 1 is an isometric view of a partly wrapped package of stacked sliced process cheese, a portion of the wrapper being cut away to better illustrate the contents of the wrapper;

Figure 2 is similar to Figure 1 and shows the package of cheese when it is wrapped but prior to completely sealing the wrapper;

Figure 3 is an isometric view of a stack of cheese packages shown in Figure 2 and contained in a wrap-around cardboard receptacle;

Figure 4 illustrates a blank that is used to form a shipping carton which is adapted to receive a plurality of package units of the character shown in Figure 3;

Figure 5 is an isometric view of a carton derived from the blank shown in Figure 4 and containing four package units of the type shown in Figure 3;

Figure 6 is a view in side elevation of an arrangement of apparatus for practicing the invention, parts being omitted for better illustration of other parts;

Figure 7 is an enlarged, cross-sectional view taken along line 7—7 of Figure 6;

Figure 8 is an enlarged, cross-sectional view taken along line 8—8 of Figure 6;

Figure 9 is a view taken along staggered line 9—9 of Figure 6 and additionally shows a portion of a chute for delivering unsealed cartons containing packaged cheese to the remainder of the apparatus; and Figure 10 is a schematic representation of a system of apparatus for controlling the operation of each of the pair of fluid-actuated reciprocable means that are also shown in Figure 6.

Referring now to Figure 1 of the drawings, numeral 15 generally indicates a partially wrapped and sealed small package of cheese, consisting of a stack of process cheese slices 16, arranged in superposed aligned relation, and a heat-sealable wrapper 17 of the character referred to earlier herein. The package contains 4 slices of cheese and weighs one-half pound. The cheese slices, upon being bisected transversely to their length, are suitable for use in making sandwiches.

Wrapper 17 is applied to the stack of cheese slices by means of a conventional wrapping machine at which time the overlapping extremities of the wrapper are heat-sealed to obtain a longitudinal seam 18. Also, the narrow side parts of wrapper end portions 19, that extend beyond corresponding ends of the cheese slices, are folded over the ends of the stack, as indicated at 20 in Figure 2, so that their free ends 21 overlie the top of the stack. The abutting parts of the wrapper, with the exception of those that make up the seam 18, are left unsealed. This completes the wrapping of the cheese. The temperature of the cheese at the time of wrapping is within the range of 30 to 65° F. to preserve the same and to permit of ready handling.

A plurality of cheese packages 15 is then stacked, as shown in Figure 3, with a cardboard divider 22 interposed between successive packages. The stack of Figure 3 is placed in a scored, wrap-around cardboard 23. End flaps 24 and 25 of the wrap-around cardboard form a full overlap at the top, uppermost flap 25 being held in place by an adhesive strip 26, as shown. The adhesive strip may consist of any suitable material, such as cellophane tape, or the like. The arrangement of the five small cheese packages 15, dividers 22, and wrap-around cardboard 23, shown in Figure 3, is hereinafter identified as a large cheese package 27, containing 2½ pounds of cheese.

Referring to Figure 4, a corrugated cardboard blank 28 is slitted and scored to define a series of panels 29—34, inclusive, which are adapted to be readily folded with respect to each other to obtain a shipping container or carton 37 (Figure 5). Panel 29 of the blank constitutes the carton bottom wall, panels 30 constitute its side walls, panels 31 its end walls, panels 32 its inner top flaps, panels 33 its outer top flaps, and panels 34 its end flaps. Flaps 33 and 34 are provided with corresponding adhesive strips 35 and 36, respectively. These adhesive strips may be composed of any appropriate glue, which, when moistened, is capable of effecting firm adherence of outer top flaps 33 to inner top flaps 32, and each pair of end flaps 34 to a corresponding end wall 31.

The carton 37 is of a size to snugly accommodate four large cheese packages 27 that contain a total of 10 pounds of cheese. It is to be noted that the exposed ends of small packages 15 bear against the inner surfaces of corresponding side walls 30 of the carton.

Reference is next had to Figures 6 to 9 for an understanding of the construction of the apparatus shown in those views. The apparatus includes a support, generally indicated by numeral 40, and comprising a plurality of upstanding legs 41, a series of horizontally arranged channel stretchers 42, that are welded or otherwise secured to corresponding legs, and a top 43, in the form of an I-beam which rests on stretchers 42. As is best shown in Figures 6 and 7, top 43 consists of a horizontally disposed web 44, a pair of upper flanges 45, and a pair of lower flanges 46. Web 44 may be considered as constituting an elongated counter while upper flanges 45 are in the nature of side rails for the counter. One upper flange 45 is cut away at its rearward end, as indicated at 47, while both of these flanges are cut away at their forward ends, as indicated at 48 in Figures 6 and 9.

A chute 50 is secured to the rear end of the support and is at right angles to top 43 (Figure 9). The chute includes a top 51, the upper surface of which is flush with the upper surface of counter 44, and a pair of parallel, spaced-apart upstanding side rails 52. The space between the chute side rails is slightly greater than the length of cartons 37 whereby the cartons may be slid along the chute, moved past cut-out 47, and then fed onto counter 44, as required.

Also secured to the rear end of the support is a first fluid-actuated reciprocable means for advancing cheese-containing cartons 37 forwardly along counter 44. This means preferably comprises a cylinder 53 that contains a horizontally reciprocable piston 54 which is preferably actuated by air admitted into the cylinder. The piston is provided with a piston rod 55 that extends through and beyond the cylinder and carries a carton pusher plate 56 at its outer end. Attached to and projecting laterally of plate 56 is a trip member 57.

An inverted channel-shaped press member 60 is provided with longitudinal grooves 61 (Figure 7). Two upstanding, spaced, parallel plates 62 are secured to flanges 45 of top 43 and are coextensive with press member 60. Each plate 62 registers with a corresponding groove 61 in the press member. A plurality of angle brackets 63 is attached to each side of top 43 and each is provided with a spring-engaging boss 64. Like angle brackets 65 are attached to the flanges of member 60 and are provided with depending bosses 66 which are vertically aligned with corresponding bosses 64. Each pair of vertically aligned bosses 64 and 66 is adapted to engage a corresponding compression spring 67 and retain the same in position. These springs normally and yieldingly urge press member 60 upwardly with respect to top 43.

The apparatus also comprises a second fluid-actuated reciprocable means that consists of a cylinder 70 which contains an air-actuated, vertically reciprocable piston 71 having a piston rod 72 which extends through the bottom of the cylinder and terminates in a head 73. Cylinder 70 is carried by the support and is so arranged that piston rod head 73 is located directly above and midway between the ends of member 60. Compressed air admitted into the upper end of cylinder 70 moves piston 71, piston rod 72 and head head 73 downwardly, thereby moving channel member 60 downwardly a corresponding extent against the action of springs 67. Depending from channel member 60 is an arm 74 that is adapted to depress a spring-loaded stem 75 and thereby open a quick-opening valve 76 in response to predetermined downward movement of the press member with respect to the top. Valve 76 is an element of the system shown in Figure 10 and its function will be described further along in this description.

There is provided a heating means, best shown in Figures 6, 8 and 9, and comprising a pair of parallel hollow heat-conductive plates or devices 77 and 78. Contained in each heating plate is an electrically energized heating element 80. Both plates 77 and 78 are mounted on the top immediately forward of a corresponding side rail 45. Plate 77 is stationary, while plate 78 is movable toward and away from plate 77 as allowed by a pair of pins 81 that extend through openings in brackets 82 which are secured to lower top flanges 46. Coaxial with each pin 81 is a compression spring 83 that bears at one end against a corresponding bracekt 82 at its other end against plate 78. Springs 83 normally and yieldingly urge plate 78 toward plate 77. Plates 77 and 78 are beveled, as indicated at 84 and 85, respectively, to facilitate movement of the cartons in the region of these plates in the course of advancement of the cartons along counter 44. A conveyer 86 projects forwardly of the support and is provided with a series of rollers 87.

In Figure 10, there is shown a schematic arrangement of devices for controlling the operation of piston 54 in cylinder 53, piston 71 in cylinder 70, and associated parts, with the aid of compressed air that is furnished by a source of compressed air supply 90 to a main conduit 91. Such devices comprise a starting valve 92, a combined pilot valve and timer 93, a first 4-way valve 94, a second 4-way valve 95, and quick-opening valve 76, referred to earlier in this description. Starting valve 92 is connected by a branch conduit 96 to main conduit 91, and by a conduit 97 to valve 93. The starting valve is adapted to be manually opened by a lever 100 that is pivotally connected to the valve, as indicated at 101. A spring 102 is connected at its opposite ends to lever 100 and to a bracket 103 that is mounted on valve 92. This spring is stressed in tension and normally biases lever 100 in a clockwise direction to maintain valve 92 closed. Combined valve and timer 93 is connected to main conduit 91 by a branch conduit 104, and to valve 94 by a conduit 105. Another branch conduit 106 connects main conduit 91 directly to valve 94. Conduits 107, 108 and 109, respectively, connect valve 94 to the rear end of cylinder 53, to the front end of that cylinder, and to valve 76. A further branch conduit 110 establishes communication between main conduit 91 and valve 95 which is, in turn, connected to the upper and lower ends of cylinder 70 by conduits 111 and 112, respectively. A bell lever 113 is pivoted to valve 95 at 114 for controlling the operation of this valve. A tension spring 115 is connected at one end to lever 113 and at its other end to a pin 116 that is carried by support 40 (Figure 6). This spring normally urges lever 113 in a clockwise direction to position the valve in a manner that the compressed air from supply 90 is prevented from entering cylinder 70.

For the purpose of describing the operation of the illustrated apparatus, it is first assumed that cartons 37 are packed with the large packages of cheese 27, as shown in Figure 5, and that the various adhesive strips 35 and 36 are moistened. A plurality of these cartons are placed on chute 50, in inverted position from that shown in Figure 5 to hold flaps 33 in place, and are successively fed onto counter 44, as required. The apparatus is primed by feeding two dummy cartons onto counter 44 directly ahead of the first cheese-containing carton. As each carton 37 is moved to a position immediately forward of plate 56, the operator depresses starting lever 100 against the action of spring 102. Valve 92 is thereby opened permitting air from supply 90 to enter combined timer and pilot valve 93 by way of conduit 97. This opens valve 93 and sets its timer to hold valve 93 open for the desired period of time, which may range from 5 seconds to one minute. While valve 93 is open, it allows compressed air supplied by conduit 104 to flow through conduit 105 and into valve 94 to operate the latter valve and permit compressed air in conduit 106 to flow through conduit 107 and thence into the back end of cylinder 53. The compressed air so admitted into cylinder 53 moves piston 54, piston rod 55 and plate 56 forwardly or toward the right, as viewed in various figures in the drawing. As plate 56 moves forwardly, it advances all cartons, already on the support, forwardly along counter 44.

As piston 54 approaches the end of its forward stroke, trip member 57 engages lever 113, imparting sufficient counter-clockwise pivotal movement thereto against the action of spring 115 to operate valve 95 so as to permit compressed air in conduit 110 to enter the upper end of cylinder 70 by way of conduit 111. The compressed air, thus admitted into cylinder 70, moves piston 71, piston rod 72 and head 73 downwardly, causing press member 60 to move downwardly against the action of its springs 67. Press member 60 thereby coacts with support top 43 and associated devices to exert sufficient pressure on the cartons located beneath the press member to expel substantially all air that may be entrapped within the wrappers of small cheese packages 15. This pressure, for best results, should be within the range of 200 to 400 pounds for each pound of cheese. As will be noted from an examination of Figures 6 and 9, the apparatus is adapted to exert the selected pressure on three cartons of cheese 37 at one time. Thus, as each carton is advanced along the support top, it is placed under pressure three times by the apparatus. Arm 74 depresses valve stem 75 in response to downward movement of press member 60, thereby opening valve 76 and permitting compressed air in conduit 91 to flow through conduit 109 and thence into valve 94. Air admitted into valve 94 by way of conduit 109 operates that valve to place conduit 107 out of service and permit compressed air to flow into the front or head end of cylinder 53 by way of conduit 108. Air, so admitted into cylinder 53, moves piston 54 and the parts connected thereto toward the left (Figure 10), effecting disengagement of trip member 57 from valve lever 113 and permitting the same to return to its normal position. This places conduit 110 out of communication with conduit 111, allowing air previously admitted into the upper end of cylinder 70 to be bled therefrom. At the same time, compressed air in conduit 110 is admitted into the lower end of cylinder 70 by way of conduit 112, moving piston 70 upwardly and allowing springs 67 to again raise press member 60 with respect to the support top. This permits valve 76 to close and unload the air supply to the front end of cylinder 53. The above described cycle of operation is repeated when starting lever 100 is again actuated.

Each carton, after being subjected to pressure as outlined above, is advanced to a position between plates 77 and 78 of the heating means. The heat developed by the heating means is sufficient to penetrate through corresponding sides of the carton to effect sealing of the parts of the wrapper in the region of the end portions of individual packages 15. This completes the sealing of cheese packages 15 in each carton. The cartons are then moved onto conveyer 86 and are ready for shipment.

From the foregoing, it is believed that the method of practicing our instant invention will be readily comprehended by persons skilled in the art. It is to be clearly understood, however, that various changes in the herein described method of practicing the invention may be resorted to without departing from the spirit of the invention as defined by the appended claims.

We claim:

1. The method of packaging cheese comprising enclosing a quantity of the cheese in a heat-sealable wrapper to obtain a wrapped cheese package in which at least one part of the wrapper bears against and is unsealed with respect to another part thereof, subjecting the package to pressure within the range of 200 to 400 pounds per pound of cheese in the package to expel substantially all air from its interior, and applying heat to effect sealing of said parts of the wrapper to each other.

2. The method in accordance with claim 1, wherein the package is subjected to said pressure for a time interval within the range of 5 seconds to one minute.

3. The method in accordance with claim 1, wherein the temperature of the cheese during the enumerated steps is within the range of 30 to 65° F.

4. The method of packaging cheese comprising enclosing a quantity of cheese having a temperature within the range of 30 to 65° F. in a heat-sealable wrapper comprising a thin, flexible material that is impervious to air and moisture, whereby to obtain a wrapped cheese package in which at least one part of the wrapper bears against and is unsealed with respect to another part thereof, subjecting the package to a pressure within the range of 200 to 400 pounds per pound of cheese in the package for a time interval within the range of 5 seconds to one minute to thereby expel substantially all air from the interior of the package, and applying heat to effect sealing of said parts of the wrapper to each other.

5. The method of packaging cheese comprising arranging a plurality of process cheese slices that are substantially equal in size in aligned stacked relation, enclosing the cheese stack derived from the preceding step in a heat-sealable wrapper in a manner that opposite end portions of the wrapper extend beyond corresponding ends of the cheese stack, folding each end portion of the wrapper so that a part thereof bears against and is unsealed with respect to another part in the region of the corresponding end of the cheese stack to obain a wrapped cheese package, subjecing the package to pressure within the range of 200 to 400 pounds per pound of cheese in the package to expel substantially all air from its interior, and applying heat to effect sealing of said parts of the wrapper to each other.

6. The method in accordance with claim 5, wherein the package is subjected to said pressure for a time interval within the range of 5 seconds to one minute.

7. The method in accordance with claim 5, wherein the temperature of the cheese during the enumerated steps is within the range of 30 to 65° F.

8. The method of packaging cheese comprising arranging a plurality of process cheese slices, that are at a temperature within the range of 30 to 65° F. and that are substantially equal in size, in aligned stacked relation, enclosing the cheese stack derived from the preceding step in a heat-sealable wrapper comprising a thin, flexible material that is impervious to air and moisture, in a manner that opposite end portions of the wrapper extend beyond corresponding ends of the cheese stack, folding each end portion of the wrapper so that a part thereof bears against and is unsealed with respect to another part in the region of the corresponding end of the cheese stack to obtain a wrapped cheese package, subjecting the package to a pressure within the range of 200 to 400 pounds per pound of cheese in the package for a time interval within the range of 5 seconds to one minute to thereby expel substantially all air from the interior of the package, and applying heat to effect sealing of said parts of the wrapper to each other.

9. The method of packaging cheese comprising arranging cheese slices in a plurality of stacks, the slices in each stack being susbtantially equal in size and aligned, enclosing each cheese stack in a heat-sealable wrapper in a manner that end portions of the wrapper extend beyond corresponding ends of the stack, folding each such end portion of the wrapper so that a part thereof bears against and is unsealed with respect to another part in the region of the corersponding end of the cheese stack to obtain a wrapped cheese package that is sealed except for at least one of said end portions, arranging a plurality of the wrapped cheese packages in aligned reation in a carton with said end portions disposed adjacent corresponding walls of the carton, while the cheese is at a temperature of 30° to 65° F. subjecting the carton and contained packages to pressure within the range of 200 to 400 pounds per pound of cheese in the packages for a time interval of 5 seconds to one minute to expel air from the interior of the packages, and applying heat to the ends of the packages through the material of the carton to effect sealing of said parts of each wrapper to each other.

10. The method in accordance with claim 9 wherein spacing members are disposed between cheese packages in the carton to maintain the shape of the packages while the pressure is applied thereto.

References Cited in the file of this patent

UNITED STATES PATENTS

| | | |
|---|---|---|
| 1,415,943 | Meyers | May 16, 1922 |
| 1,925,443 | Gere | Sept. 5, 1933 |
| 1,981,986 | Bruhn | Nov. 27, 1934 |
| 1,992,821 | Gere | Feb. 26, 1935 |
| 2,077,300 | Abrams et al. | Apr. 13, 1937 |
| 2,109,093 | Rossman et al. | Feb. 22, 1938 |
| 2,246,016 | Sinclair | June 17, 1941 |
| 2,361,749 | Davis | Oct. 31, 1944 |
| 2,471,867 | Fisher et al. | May 31, 1949 |
| 2,540,815 | Eldredge | Feb. 6, 1951 |